United States Patent Office 3,144,339
Patented Aug. 11, 1964

3,144,339
BREAD EMULSIFIER COMPOSITION AND
PROCESS OF MAKING THE SAME
Gaston Dalby, New York, N.Y., and Harry C. Fisher, Cleveland, Ohio, assignors to The H. C. Fisher Company, Cleveland, Ohio, a corporation of Ohio
No Drawing. Filed June 8, 1962, Ser. No. 200,964
11 Claims. (Cl. 99—91)

Our invention relates to an emulsifier for continuous processes for making bread dough and for a process for making said emulsifier.

In the continuous process for making bread dough, those parts of the dough which are soluble or emulsifiable in water, such as sugar and milk, are dissolved or emulsified in water together with yeast to form an aqueous broth and a continuous stream of the broth is admixed in a fixed ratio with a continuous stream of flour to form the dough. The broth is passed through a fine mesh screen before being mixed with the flour to eliminate any lumps or coarse particles. To form a uniform dough the various ingredients of the broth must be completely dissolved or emulsified in the water of the broth. Upon completion of the mixing, the mixture is then placed in pans to rise and is then baked.

One of the ingredients of the broth is glycerol monostearate. Its function in the bread is to retard staling of the bread and to aid in the formation and retention of a desirable cell structure in the crumb of the bread. Glycerol monostearate is insoluble in water and melts at a temperature ranging from 130° to 140° F., which is above normal bread dough temperature.

In continuous bread manufacture, glycerol monostearate may be added at two points: with the liquid shortening or in the brew or broth. If it is added with the shortening, it cannot be added in the emulsified form but is fed into the bread mix dissolved in the hot shortening. The best functional action is not obtained from the glycerol monostrearate when used in this manner. It must form a semi-chemical bond with the starch and when it is dissolved in the fat phase, contact with the starch is retarded.

For best functional activity, the glycerol monostearate must be pre-emulsified with water before being added to the dough. When the glycerol monostearate is added in the emulsified form to the broth, it must disperse readily and completely without leaving any lumps of material on the filtering screens. When an emulsion of glycerol monostearate is prepared and allowed to stand for even a short length of time, lumps of glycerol monostearate form which are extremely difficult to break up and which, if added to a broth, will cause the screens to malfunction. It is therefore necessary to add to the glycerol monostearate some material which will prevent the formation of lumps and which, when the emulsion is added to the broth in the continuous process of bread manufacture, will aid in the complete dispersion of the material.

We have discovered that lecithin will perform this function. The quantities are critical in relation to the glycerol monostearate. Too little lecithin will not be effective; too much lecithin changes the characteristics of the finished mix into an emulsion of a fat rather than to accomplish the dispersion of glycerol monostearate, which is a surface-active material.

The relation of glycerol monostearate to water is important. Too little glycerol monostearate is not economically satisfactory. Too much glycerol monostearate in relation to the water prevents complete hydration of the glycerol monostearate and thus lowers its efficiency in the bread. Also too high a percentage of glycerol monostearate will form a hard mass when cooled, which is very difficult to break up and is unsatisfactory for use in a broth.

Glycerine is also added to the glycerol monostearate. The percentage is important. Its function is to assist in the complete hydration of the glycerol monostearate and thus improve its functional activity.

In case the glycerol monostearate contains no residual sodium stearate, it is necessary to add trace quantities to facilitate the formation of the emulsion. Sodium propionate may be present to prevent mold formation in the finished emulsion during holding and shipping.

Glycerol monostearate is difficult to hydrate and form a complete dispersion. Under its melting point, in a mix with water, it will not hydrate. At its melting point, it hydrates so rapidly that it forms a gel which consists in part of non-hydrated and hydrated material. This gel is extremely difficult to break up.

We have developed a method of preparation which facilitates the formation of a completely dispersed material. A mix is made as follows:

| | Parts |
|---|---|
| Glycerol monostearate (distilled) | 20 |
| Glycerine | 15 |
| Lecithin | 1 |
| Sodium propionate | 0.4 |
| Sodium stearate (if necessary) | 0.02 |
| Water | 26.0 |

These materials are mixed together at room temperature, then heated slowly without stirring until the boiling point is reached. It is then removed from the heat and the foam permitted to subside. Then it is re-heated until complete hydration of the monostearate has been accomplished. This is determined by the clearness of the solution. It is almost water-clear in appearance. The solution is then permitted to cool to about 140° F. It is then placed in a mixer and an additional 37.58 parts of water are added. The added water may be about 80° F. If the added water is too cold, it will cause difficulty. The product is mixed until a cream-like product is obtained and the temperature has fallen to the 90–100 degree range.

The glycerol monostearate may range from 15 parts by weight to 25 parts by weight of the finished product. The glycerine may vary from about 11 to 20 parts by weight of the finished product. The lecithin may vary from 0.75 to 5 parts by weight of the finished product. Sodium propionate is used to protect against mold and is not critical in the formation of the emulsion. Sodium stearate is added only in the case where the glycerol monostearate contains no residual sodium monostearate.

Having described our invention, we claim:

1. An emulsion for making bread dough which comprises an aqueous emulsion containing 15 to 25 parts by weight of glycerol monostearate, 11 to 20 parts by weight of glycerine and 0.75 to 5 parts by weight of lecithin, and water to make a total of 100 parts.

2. The emulsion of claim 1 containing 0.02 part by weight of sodium stearate.

3. The emulsion of claim 2 containing 0.4 part by weight of a propionate.

4. The emulsion of claim 3 in which the propionate is sodium propionate.

5. An emulsion for making bread dough which comprises 20 parts by weight of glycerol monostearate, 15 parts by weight of glycerine, 1 part by weight of lecithin, 0.4 part by weight of sodium propionate, and 63.58 parts by weight of water.

6. The emulsion of claim 5 in which said emulsion is a cream-like product.

7. A process for making an emulsion for making bread dough which comprises mixing at room temperature 15 to 25 parts by weight of glycerol monostearate, 11 to 20 parts by weight of glycerine, 0.75 to 5 parts by weight of lecithin and 26 parts by weight of water, slowly heating said mixture to the boiling point, discontinuing the heating until the foam subsides, then reheating until complete hydration of the monostearate is accomplished, cooling to about 140° F. and then mixing into the emulsion at about 80° F. sufficient water to bring the total of parts to 100.

8. The process of claim 7 in which said emulsion contains trace amounts of sodium stearate to 0.02 part by weight.

9. The process of claim 8 in which 0.4 part by weight of a propionate is added to the mix.

10. A process for making an emulsion for making bread dough which comprises mixing at room temperature 20 parts by weight of glycerol monostearate, 15 parts by weight of glycerine, 1 part by weight of lecithin, 0.4 part by weight of sodium propionate, 0.02 part of weight of sodium stearate and 26 parts by weight of water, slowly heating said mixture to the boiling point, discontinuing the heating until the foam subsides, then reheating until complete hydration of the monostearate is accomplished, cooling the mixture to about 140° F. and then mixing into the emulsion at about 80° F. sufficient water to bring the total of parts to 100.

11. The process of claim 10 which comprises mixing the emulsion after the final addition of water until a cream-like product is obtained and the temperature has fallen to a 90 to 100 degree range.

References Cited in the file of this patent

UNITED STATES PATENTS

| | | |
|---|---|---|
| 2,236,867 | Bunzell | Apr. 1, 1941 |
| 2,508,393 | Jaeger | May 23, 1950 |
| 2,978,332 | Ferrari | Apr. 4, 1961 |

FOREIGN PATENTS

| | | |
|---|---|---|
| 289,060 | Great Britain | Mar. 28, 1929 |